Nov. 8, 1966 J. CHOLET 3,284,764

DEVICE FOR RECORDING SEQUENTIAL TRAINS OF VIBRATIONS AFTER PASSAGE THROUGH AN INTERVENING MEDIUM

Filed July 8, 1963 4 Sheets-Sheet 1

INVENTOR

JACQUES CHOLET

BY Toulmin & Toulmin

ATTORNEYS

INVENTOR
JACQUES CHOLET
BY Toulmin & Toulmin
ATTORNEYS

Nov. 8, 1966 J. CHOLET 3,284,764

DEVICE FOR RECORDING SEQUENTIAL TRAINS OF VIBRATIONS AFTER PASSAGE THROUGH AN INTERVENING MEDIUM

Filed July 8, 1963 4 Sheets-Sheet 3

INVENTOR

JACQUES CHOLET

BY Toulmin & Toulmin

ATTORNEYS

INVENTOR

JACQUES CHOLET

BY Krafft & Wells

ATTORNEYS

United States Patent Office 3,284,764
Patented Nov. 8, 1966

3,284,764

DEVICE FOR RECORDING SEQUENTIAL TRAINS OF VIBRATIONS AFTER PASSAGE THROUGH AN INTERVENING MEDIUM

Jacques Cholet, Rueil-Malmaison, France, assignor of one-half to Institut Francais du Petrole, des Carburants et Lubrifiants, and of one-half to Compagnie Generale de Geophysique, Paris, France

Filed July 8, 1963, Ser. No. 293,363
Claims priority, application France, July 16, 1962, 904,139
11 Claims. (Cl. 340—15.5)

This invention relates to a device for optical control and recording of sequential trains of vibrations.

It is an object of this invention to control a generator of mechanical vibrations through optical means wherein the generator may be of the hydraulic or electrodynamic type.

It is another object of this invention to generate trains of vibrations constituting a complex electric signal and to simultaneously record said generated signal.

It is still another object of this invention to pick up simultaneously the generated signals and the reflected and/or refracted corresponding signals received after travel through the medium subjected to the vibrations and to record them separately by means of a plurality of recorders, in view of a subsequent comparative analysis thereof.

It is yet another object of this invention to carry out mechanical surveying of soils, roads or works of art, as well as seismic prospecting, by generating successive trains of vibrations forming a composite signal, simultaneously recording the same and the corresponding reflected and/or refracted trains and comparing the latter to the generated composite signal.

These and other objects as may be apparent from the following specification and claims are achieved according to this invention by controlling the generation of the trains of vibrations by means of a photoelectric cell reading, on a track of a drum, an optical program band and by recording the so generated signal as well as the reflected and/or refracted corresponding signal by means of optical recording systems rigidly locked to said drum bearing the program band and drawn in rotation therewith.

The trains of vibrations are generated sequentially either from the same point or from a plurality of points of different locations. The drums bearing the bands on which are respectively recorded the generated signals and the reflected and/or refracted signals are centered on the same axis as the drum bearing the program band but are stationary. The recording of the generated signals is carried out in view of a subsequent comparison with the recording of the reflected and/or refracted signals.

The invention will be explained more in detail hereinafter in connection with a particular embodiment thereof given by way of non-limitative example and with reference to the accompanying drawings forming a part of this application, in which drawings.

Figure 1:
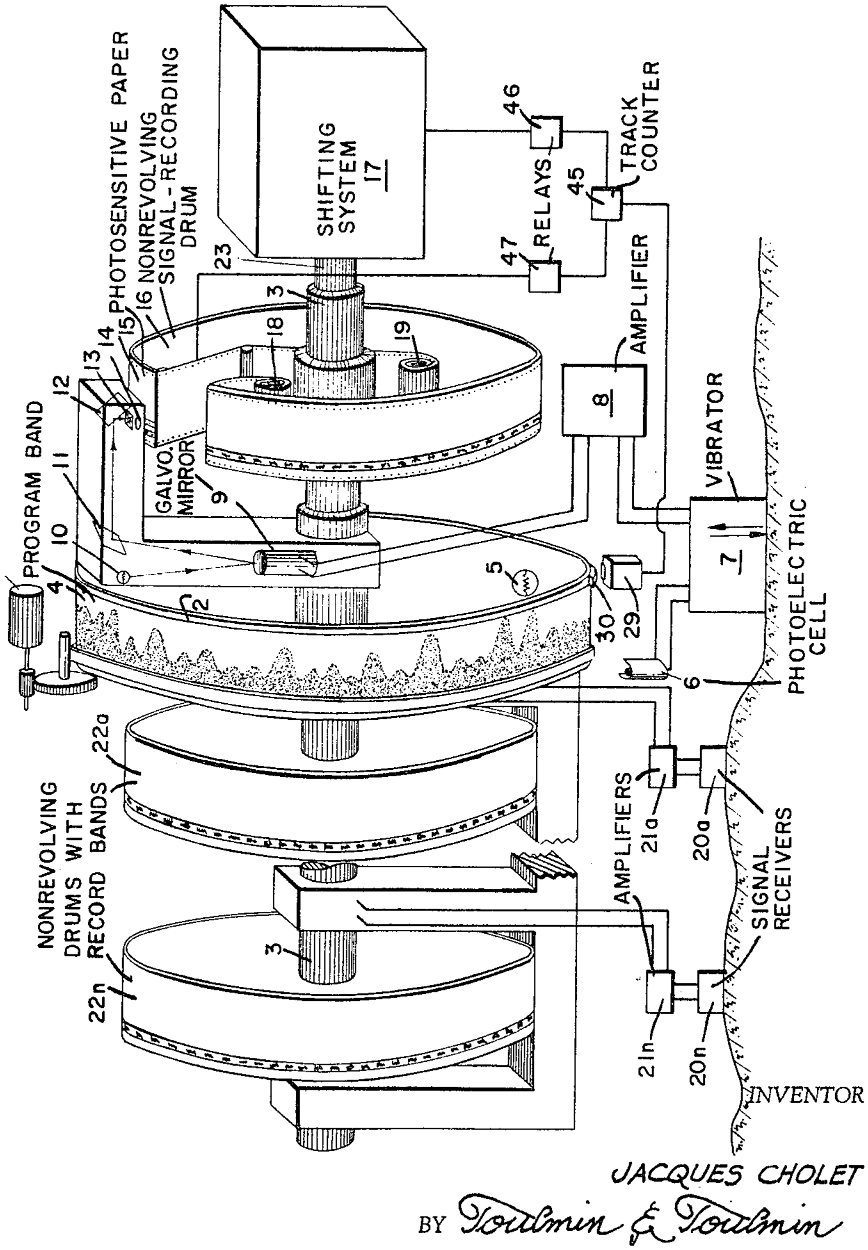
FIGURE 1 is a somewhat schematic view of a general assembly of apparatus according to the invention comprising reading optical means of the program band.

As shown in FIGURE 1, a drum 2 rotatable about a shaft 3 and bearing a program band 4 is driven in rotation by motor 1, through a belt or roller mechanism or any other convenient device. This program band may consist of a film having the program printed thereon in variable density or variable area, in which case the drum will be made of a translucent material. The program band may also be opaque as well as the drum, in which case the reading of the band is made by reflection. The revolving speed of the drum 2 bearing the program band is maintained constant by controlling means of conventional type or, for instance, by using a synchronous motor.

The program band 4 is displaced in front of a light source 5 cooperating with a photoelectric cell 6 which emits electric signals corresponding to the reading of the program band, said electric signals being used for actuating a vibrator 7 which may be of the hydraulic or electrodynamic type. The program band 4 may also consist of a magnetic tape read by a sensing head 55. The vibrator 7 transmits to the soil at each revolution of the drum 2, a train of vibrations whose frequency and intensity vary according to the selected program.

This train of vibrations may be reproduced at will either at the same point or at different locations, all the trains of vibration being identical as long as the same program band is used on the drum 2 and the revolving speed of the latter is kept unchanged.

However, casual phenomena may cause a slight difference to occur between two consecutive trains of vibrations produced by reading of the same program band.

It is therefore very useful to record the generated signals as such to permit subsequent comparison thereof with the corresponding reflected and/or refracted signals.

Accordingly, the generated signal, after amplification in an amplifier 8 is supplied to a galvanometer the mirror 9 of which receives a light beam from a light source 10. This beam is reflected on a second mirror 11 and from there to still another mirror 12. It passes then through a diaphragm stop 13 and a lens 14 and impresses a photographic paper strip 15 mounted on a non-revolving drum 16 centered on shaft 3.

The device comprising the light source, the galvanometer, the various mirrors and the lens is rigid with the program bearing drum 2.

Alternatively, a light modulator may be used instead of the assembly of a light source and a galvanometer. The connection between the outlet of the amplifier 8 and the terminals of the galvanometer is effected by means of revolving contact members.

In this way, to each revolution of program band 4, i.e., to each train of vibrations, corresponds the recording of the generated signal on one track of the band 15 on the non-revolving drum 16.

After the end of each train of vibrations a shifting system 17 comprising, for instance, a rack, the operation of which will be described hereinafter, controls the displacement of the drum 16 along the shaft 3. This displacement is adjusted to such a length as to provide for the recording of the signal corresponding to the new train of vibrations on a track adjacent to the preceding one.

The drum 16 is also provided with an inner storage capacity for the film ends, on two spools 18 and 19. When a group of trains of vibrations has been completed and all the tracks on the band 15 have been impressed by the recording of the generated signals of this group, the band is shifted by a length corresponding to the length of a track, by means of a device which will be described hereinafter. In order to substantially avoid the effect of friction of the band on the drum surface, the band 15 is advantageously lubricated.

One or more recording devices similar to that just described are used for recording the reflected and/or refracted signals.

The signals generated by the vibrator 7 are received, after travelling through the medium subjected to the vibrations, by one or more receivers or group of receivers 20*a*–20*n*. After amplification in one or more corresponding amplifiers 21*a*, 21*n*, these signals are supplied to one or more galvanometers or other convenient recording devices, whereby said signals are recorded on one or more record bands borne by corresponding drums 22*a*, 22*n*.

Figure 2:
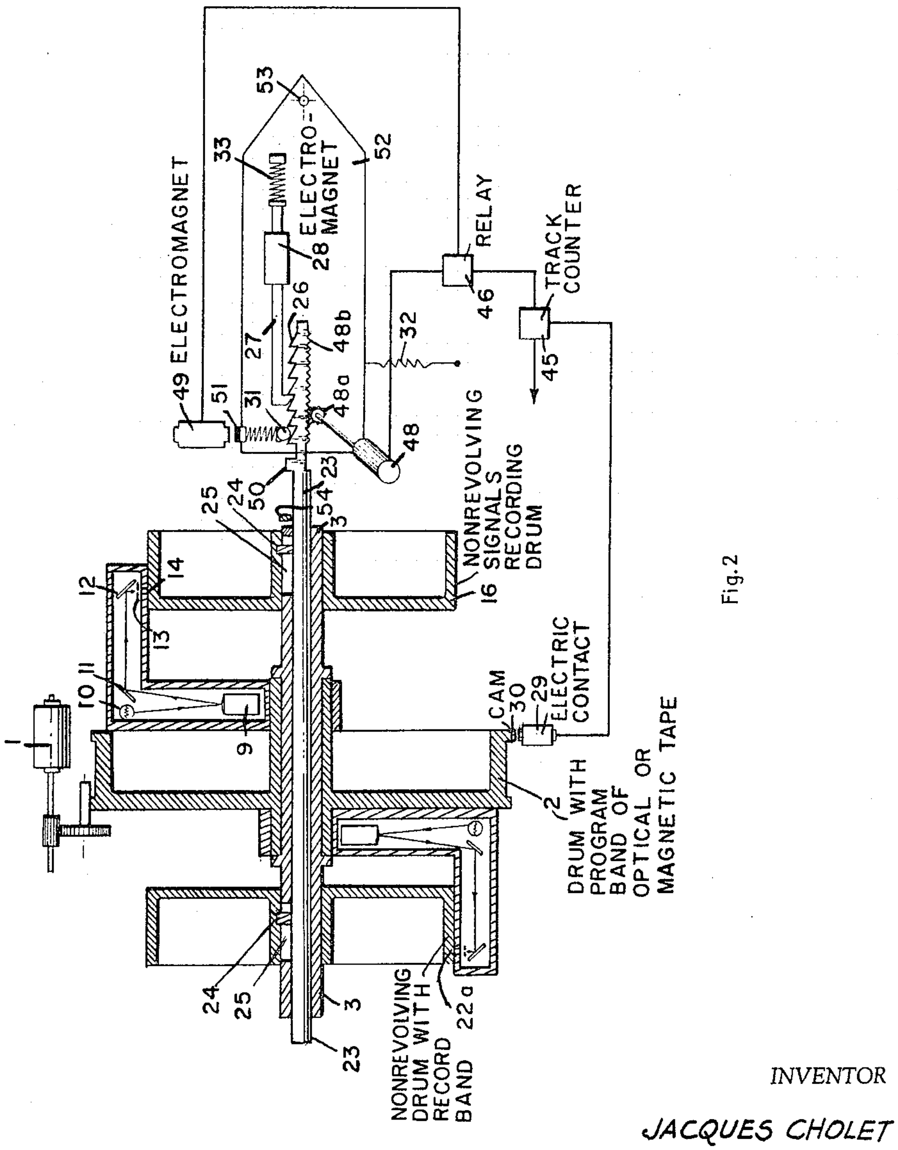
FIGURE 2 is a longitudinal sectional view showing in detail the device for shifting the drum whereon the generated signals are recorded after the recording of a complete track.

FIGURE 2 illustrates one embodiment of a device for the shifting of the generated signals recording drum 16 and of the reflected and/or refracted signals recording drums 22*a*, 22*n*.

This device is arranged as follows: The shaft 3 upon which are centered the various recording drums, consists of a hollow shaft provided with an internal rod 23 having protruding driving pins 24 to which the drums i.e., 22*a*, 22*n* are secured, whereby the latter are made solid with the rod 23. Slots 25 provided in the hollow shaft 3 have a length corresponding to the width of a record band and permit passage of the driving pins thereinto when the internal rod 23 is actuated, at each recording on a new track.

The axial shifting of rod 23 is achieved by means of a rack 26 the teeth of which are engaged by a metal ratchet 27 actuated by an electromagnet 28. At each revolution of the program bearing drum, this electromagnet 28, operated by an electric signal supplied by a micro-contact 29 (actuated, for instance, by means of a cam 30 fixed on the program bearing drum 2) controls the longitudinal displacement of the ratchet 27 whereby the engagement of the following tooth of the rack by the ratchet is ensured. When this engagement is performed, the ratchet 27 is driven back to its former position by the action of the spring 33, which results in the shifting of the associated drums by a length corresponding to that of one tooth of the rack which has been chosen equal to the width of a track on the drums.

The ratchet 27, as well as the electromagnet 28, are mounted on a base plate 52 pivotally mounted about an axis 53 so as to provide for a slight upward movement of the ratchet 27 at each engagement of a new tooth of the rack.

The locking of the rod 23 at each position thereof is carried out by means of a spring actuated ball detent 31 whereas the ratchet 27 is held in position by means of a spring 32.

Figure 3:
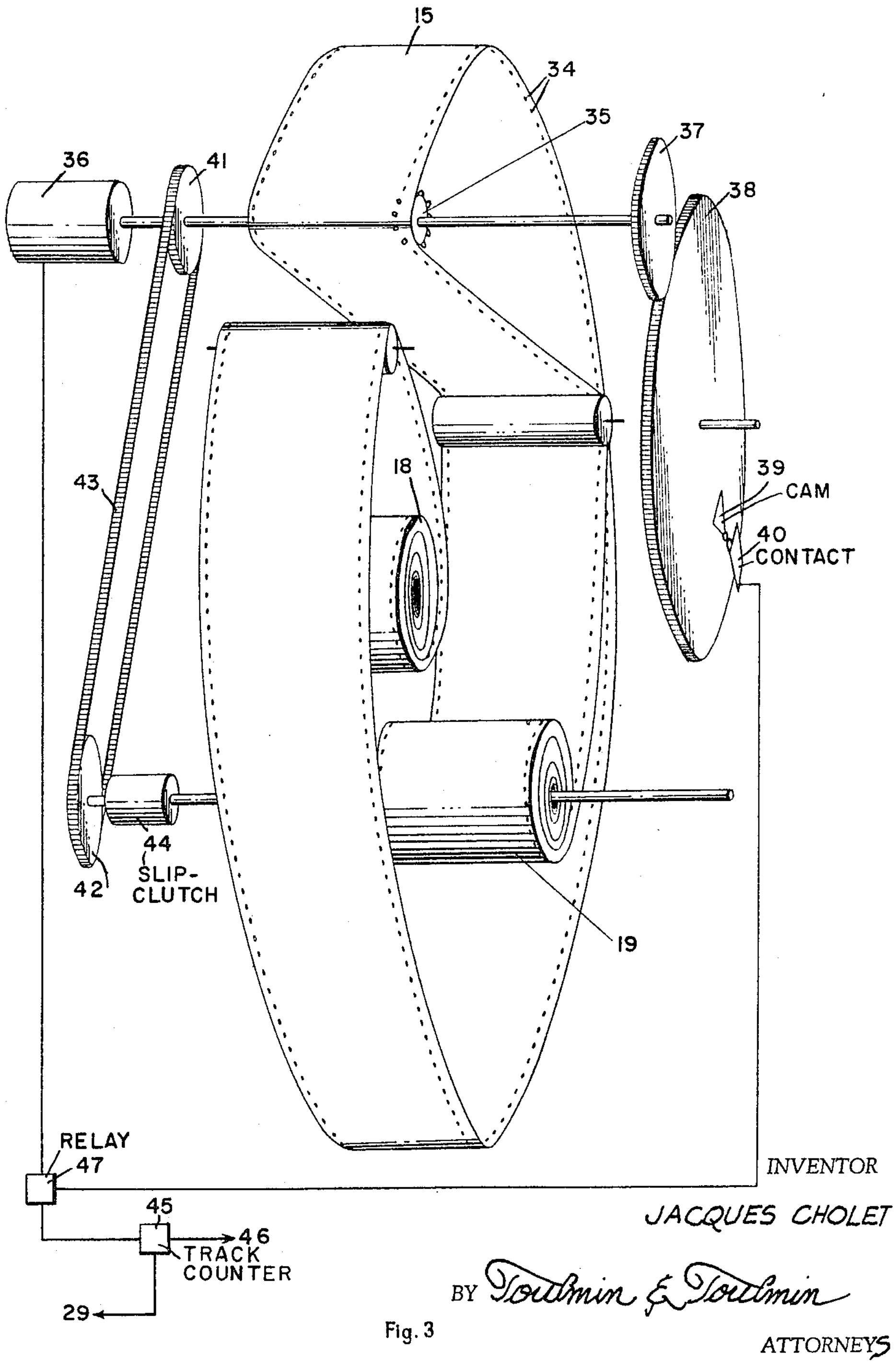
FIGURE 3 is an enlarged view of a recording drum comprising means for feeding the drum surface with a new recording band length after completion of the recording on all the tracks of the previous band length.
Figure 4:
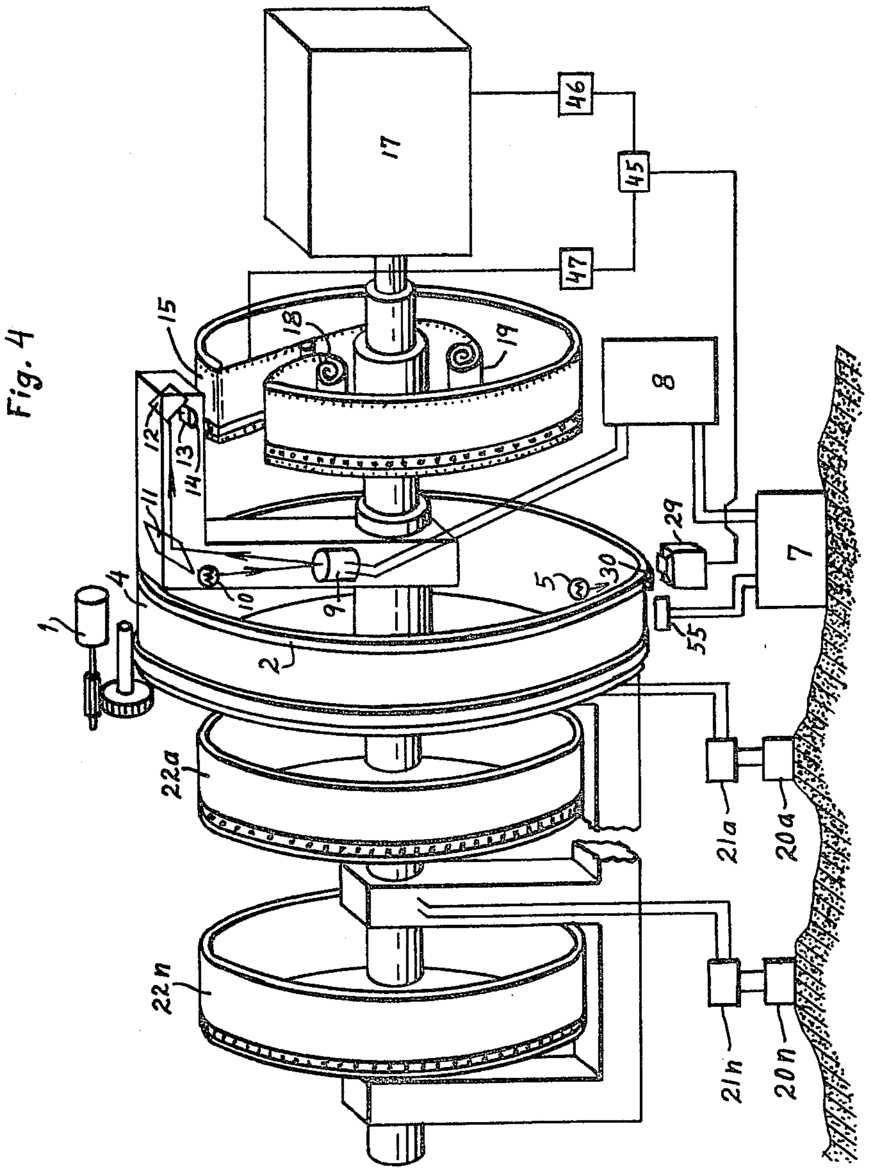
FIGURE 4 is a somewhat schematic view of a general assembly of apparatus according to the invention comprising reading magnetic means of the program band.

The micro-contact 29 (FIGURE 1) controlling the shifting of the rack 26, also controls a track counter 45 (FIGURES 1, 2 and 3). When all the tracks corresponding to a group of trains of vibrations are recorded side-by-side, the counter 45 generates a pulse which closes the circuit of a self-excited relay 46. Through said relay 46 the pulse actuates an electromagnet 49, which by attracting the magnetic piece 51 solid with the base plate 52, causes this plate to pivot about its axis 53 and, accordingly, to release the ratchet 27 and the locking ball 31.

Simultaneously, the same pulse controls the starting of a motor 48, which drives the rod 23, by means of a toothed pinion 48*a* the teeth of which are in engagement with a toothed member 48*b* rigid with said moveable rod 23, back to its former position. When the rod 23 actually occupies its initial position, it actuates by means of a protruding pin 50, a micro-contact 54 which controls the de-energization of the relay 46. The electric circuit is thus opened and the rearward movement of the rod 23 bearing the drums, is stopped.

FIGURE 3 illustrates in greater detail a mechanism provided on a drum for carrying out the feeding with a new band length after the recording of a complete group of trains of vibrations, i.e., after recording on all the tracks of the preceding band length.

For this purpose, the recording band 15 is provided with lateral perforations 34. L is the number of perforations of a band length covering the outer surface of the drum, and represents the band length to be shifted by the mechanism.

The band 15 is driven by means of a driving sprocket 35 having *d* teeth, by engagement of the latter into the perforations 34 of the band. The sprocket is itself driven by a motor 36. The sprocket is rigidly connected with a gear 37 comprising *n* teeth and which is constantly in gear with another gear 38 comprising N teeth.

In order that a single complete revolution of the gear 37 produces the sifting of the band by a length L, the values of *d*, N and *n* are selected so as to conform with the relation:

$$L=\frac{d\times N}{n}$$

The automatic starting up of the motor 36 may be achieved in the following manner:

The pulse issuing from the counter 45 at the end of the recording of all the tracks of the band simultaneously controls the closing of the circuit of a self-excited relay 47 which in turn actuates the motor 36 to rotate the sprocket wheel 35, whereby the band is shifted on the drum surface.

The de-energization of the relay 47 is controlled by means of a micro-contact 40 itself actuated by a cam 39 at each revolution of the gear 38. The resulting breaking of the circuit controls the stopping of the motor 36 and, accordingly, of the band shifting.

Furthermore, the spool 19 is driven by the motor 36 through two gears 41 and 42 operatively interconnected by a chain 43. The gear 42 drives the shaft of the spool 19 through the intermediary of a couple-limiting device 44.

From the foregoing description, one skilled in the art can easily ascertain the essential characteristics of this invention, and, without departing from the spirit and scope thereof, can make various changes and modifications of the invention to adapt it to various usages and conditions. Consequently such changes and modifications are properly, equitably and intended to be within the full range of equivalence of the following claims.

What is claimed is:

1. A device for controlling the production of signals and their recording after being passed through an intervening medium, said device comprising in combination a revolving program-bearing drum rotated at constant speed by a motor, means for reading said program and producing electric signals in conformity therewith, a vibration generator for transmitting to said intervening medium vibrations corresponding to said electric signals, means for recording the electric signals on a record band borne by a non-revolving drum, optical means for recording on bands borne by other non-revolving drums the vibrations after their passage through said medium, all of said drums being mounted on a common axis and said optical means being movable on said non-revolving drums about the same axis and driven simultaneously with the program-bearing drum, and means for shifting said non-revolving drums in unison along their common axis by a distance corresponding to the width of one of the tracks on the bands after completion of the record on said track.

2. A device for controlling the production of signals and their recording after being passed through an intervening medium, said device comprising in combination a revolving program-bearing drum rotated at constant speed by a motor, means for reading said program and producing electric signals in conformity therewith, a vibration generator for transmitting to said intervening medium vibrations corresponding to said electric signals, a plurality of optical devices for recording the electric signals and the corresponding vibrations after passage through said medium, each of said optical devices comprising, in combination with a recording photographic paper strip borne by a non-revolving drum, a mirror galvanometer associated with a source of light and an optical device directing said light, after its reflection from the mirror of said galvanometer, through a diaphragm stop and a lens onto a track on the photographic paper strip, all of said drums being positioned on a common axis and the recording optical devices being movable on said non-revolving drums about the same axis and driven simultaneously with the program-bearing drum, and means for shifting said non-revolving drums in unison along their common axis by a length corresponding to the width of one of the tracks on the paper strips after completion of the record on said track.

3. A device according to claim 1, wherein the program band consists of a film and the means for reading the program comprises a photographic cell and a source of light.

4. A device according to claim 3, wherein the program is printed on the band in the form of variable areas.

5. A device according to claim 3, wherein the program is printed on the band in the form of variable densities.

6. A device according to claim 3, wherein the film and the cylindrical periphery of the drum which bears the film are translucent, and in which the photoelectric cell and the source of light are located on opposite sides of said periphery.

7. A device according to claim 3, wherein the film is opaque and in which the photographic cell and the source of light are located on the same side of said surface.

8. A device according to claim 1, wherein the program band is a magnetic tape and the means for reading said program band consists of a sensing head.

9. A device for controlling the production of signals and their recording after being passed through an intervening medium, said device comprising in combination a revolving program-bearing drum rotated at constant speed by a motor and bearing a program band, means for reading said program band and producing electric signals in conformity with said program, an optical device for recording said electric signals on a record band borne by a non-revolving drum, a vibration generator for transmitting to said intervening medium vibrations corresponding to said electric signals, optical means for recording said corresponding vibrations on recording bands borne by other non-revolving drums, said drums being positioned on a common axis and said optical means being movable on the non-revolving drums about the same axis and driven simultaneously with the program-bearing drum, means for shifting the non-revolving drums in unison along their common axis comprising a central rod having on one end thereof a rack whose teeth have a length corresponding to the width of a track on one of the record bands, a spring-pressed ratchet device in operative engagement with the teeth of the rack, means for locking the rack in combination with electromagnetic means for periodically unlocking it after each complete revolution of the program-bearing drum whereby the central rod and the non-revolving drums are shifted by a distance corresponding to the length of one tooth of the rack.

10. A device according to claim 9, further comprising means for restoring the initial position of the non-revolving drums at the end of the recording of all the tracks of the bands thereon.

11. A device according to claim 10, further comprising means for automatically feeding the non-revolving drums with new band lengths at the end of the recording of all the tracks of the preceding band lengths.

References Cited by the Examiner

UNITED STATES PATENTS 3,209,322 9/1965 Doty ------------- 340—15.5

BENJAMIN A. BORCHELT, *Primary Examiner.*

R. M. SKOLNIK, *Assistant Examiner.*